United States Patent
Igarashi

(10) Patent No.: US 6,657,873 B2
(45) Date of Patent: Dec. 2, 2003

(54) SWITCHING POWER SUPPLY CIRCUIT

(75) Inventor: Seiki Igarashi, Tokyo (JP)

(73) Assignee: Fuji Electric Co., Ltd. (JP)

(*) Notice: Subject to any disclaimer, the term of this patent is extended or adjusted under 35 U.S.C. 154(b) by 0 days.

(21) Appl. No.: 10/227,630

(22) Filed: Aug. 23, 2002

(65) Prior Publication Data
US 2003/0058664 A1 Mar. 27, 2003

(30) Foreign Application Priority Data
Aug. 24, 2001 (JP) ......................................... 2001-253737

(51) Int. Cl.[7] .............................................. H02M 3/335
(52) U.S. Cl. ........................................... 363/17; 363/98
(58) Field of Search ................................ 363/17, 16, 15, 363/19, 20, 99, 98, 131, 132, 71, 39, 34, 41, 37, 89

(56) References Cited

U.S. PATENT DOCUMENTS

| | | | |
|---|---|---|---|
| 4,217,632 A | * 8/1980 | Bardos et al. | 363/26 |
| 4,525,774 A | * 6/1985 | Kino et al. | 363/17 |
| 4,663,699 A | * 5/1987 | Wilkinson | 363/17 |
| 5,081,570 A | * 1/1992 | Chibani et al. | 363/17 |
| 6,208,529 B1 | * 3/2001 | Davidson | 363/17 |
| 6,215,683 B1 | * 4/2001 | Mao | 363/142 |

OTHER PUBLICATIONS

"High Frequency Isolation UPS with Novel SMR"; Yamada et al.; IEEE Publication 0–7803–0891–3/93; dated 1993; pp. 1258–1263.

* cited by examiner

Primary Examiner—Rajnikant B. Patel
(74) Attorney, Agent, or Firm—Rossi & Associates

(57) ABSTRACT

A switching power supply circuit reduces the capacity of the capacitor on the load side, reducing its size, weight, and cost. The switching power supply circuit has a pair of diodes connected in series, a pair of MOSFETs connected in series, a pair of capacitors connected in series, a snubber capacitor connected in parallel with the pair of diodes, the pair of MOSFETS, and the pair of capacitors. The circuit can include a pair of additional capacitors, connected respectively in parallel with the MOSFETS, to allow the MOSFETs to execute a zero-voltage switching. The circuit also includes an AC input terminal connected to the mutual connection point of the pair of diodes, a transformer including a primary winding having one end connected to the mutual connection point of the pair of MOSFETS, and the other end connected to the mutual connection point of the pair of capacitors. The primary winding has a center tap connected to another AC input terminal.

6 Claims, 5 Drawing Sheets

SWITCHING POWER SUPPLY CIRCUIT

BACKGROUND

FIG. 5 is a diagram showing a conventional switching power supply circuit described in "High-Frequency Isolation UPS with Novel SMR" (IECOM '93, pp. 1258–1263, (1993)). Such a conventional switching power supply circuit includes a first series circuit including diodes $D_1$ and $D_2$ connected in series, a second series circuit including MOSFETs $Q_1$ and $Q_2$ connected in series, and a third series circuit including MOSFETs $Q_3$ and $Q_4$ connected in series. The conventional switching power supply circuit also includes a snubber circuit SN connected in parallel with the first through third series circuits.

A first AC input terminal U is connected to the common connection point of the diodes $D_1$ and $D_2$. A primary winding section $P_1$ of a transformer $T_1$ having center taps is connected to the common connection point of the MOSFETs $Q_1$ and $Q_2$. The other primary winding section $P_2$ of the transformer $T_1$ is connected to the common connection point of the MOSFETs $Q_3$ and $Q_4$. The center tap between the primary winding sections $P_1$ and $P_2$ of the transformer $T_1$ is connected to a second AC input terminal V.

The secondary winding sections $S_1$ and $S_2$ of the transformer $T_1$ are connected to an end of a capacitor $C_5$ via diodes $D_3$ and $D_4$, respectively. The center tap between the secondary winding sections $S_1$ and $S_2$ of the transformer $T_1$ is connected to the other end of the capacitor $C_5$. DC output terminals P and N are connected to the capacitor $C_5$.

When the transformer $T_1$ (the primary winding sections $P_1$ and $P_2$) is short circuited by switching ON the MOSFETs $Q_1$ and $Q_3$ while the AC input voltage is positive, the current of a reactor $L_1$ increases. When the MOSFET $Q_3$ is switched OFF in the state described above, the reactor current flows through the primary winding section $P_1$ from the MOSFET $Q_1$, feeding electric power to the capacitor $C_5$ via the secondary winding section $S_1$ and the diode $D_3$.

When the transformer is short circuited again by switching ON the MOSFET $Q_3$, the reactor current increases. When the MOSFET $Q_1$ is switched OFF subsequently, the reactor current flows through the MOSFET $Q_3$. The reactor current flowing through the MOSFET $Q_3$ excites the primary winding section $P_2$ of the transformer $T_1$, and electric power is fed to the capacitor $C_5$ via the secondary winding section $S_2$ and the diode $D_4$.

By repeating the operations described above at a high frequency, the AC input voltage is insulated and converted to DC electric power by the transformer $T_1$. The insulated and converted DC electric power is output via the diodes $D_3$, $D_4$ and the capacitor $C_5$. When the AC input voltage is negative, the conventional switching power supply operates in the same manner as described above by switching ON and OFF the MOSFETs $Q_2$ and $Q_4$.

The conventional switching power supply circuit employs four MOSFETs $Q_1$ through $Q_4$, a reactor $L_1$, and a snubber circuit SN. Since it is necessary for the conventional switching power supply circuit to incorporate four driving circuits, each driving any of the MOSFETs $Q_1$ through $Q_4$, the size of the conventional switching power supply circuit is large and the cost thereof is high. Since there exits certain time points where the single-phase AC input voltage is zero, the energy fed to the load is interrupted, causing large ripple voltages on the load. For obviating this problem, it is necessary for the capacitor $C_5$ on the load side to have a sufficiently large capacity. Therefore, the size of the conventional switching power supply circuit is further enlarged and the cost thereof increased even further.

Accordingly, there is a need for a switching power supply circuit that at least reduces the capacity of the capacitor on the load side to reduce its size, weight, and cost. The present application addresses this need.

SUMMARY OF THE INVENTION

The present invention relates to a switching power supply circuit. The switching power supply circuit can have a transformer, a pair of diodes, which can form a first circuit, a pair of switching devices, which can form a second circuit, a pair of capacitors, which can form a third circuit, a snubber capacitor, and first and second AC input terminals.

The transformer can have a primary winding with a center tap and a secondary winding. The pair of diodes are connected in series, as are the pair of switching devices and the pair of the capacitors. The first AC input terminal is connected to both diodes or the common connection point of the two diodes. The second AC input terminal is connected to the center tap of the primary winding. The snubber capacitor, the pair of diodes, the pair of switching devices, and the pair of capacitors are connected in parallel. One end of the primary winding is connected to both switching devices or the common connection point of the switching devices. The other end of the primary winding is connected to both capacitors or the common connection point of the pair of capacitors.

The switching power supply circuit can further include a rectifying circuit, which can be connected to the secondary winding of the transformer, and a switching means for converting a single-phase AC input voltage to a high-frequency AC voltage. The transformer can insulate the high-frequency AC voltage. The rectifying circuit can rectify the insulated high-frequency AC voltage to feed DC electric power to a load.

The switching power supply circuit can further include at least one capacitor connected in parallel with at least one of the switching devices, wherein the at least one capacitor allows at least one of the switching devices to execute a zero-voltage switching. The switching power supply circuit can adjust an ON-OFF duty ratio of one of the switching devices to regulate the current of the AC input voltage and the operating frequency of the other of the switching devices to regulate the DC electric power.

DETAILED DESCRIPTION

Figure 1:
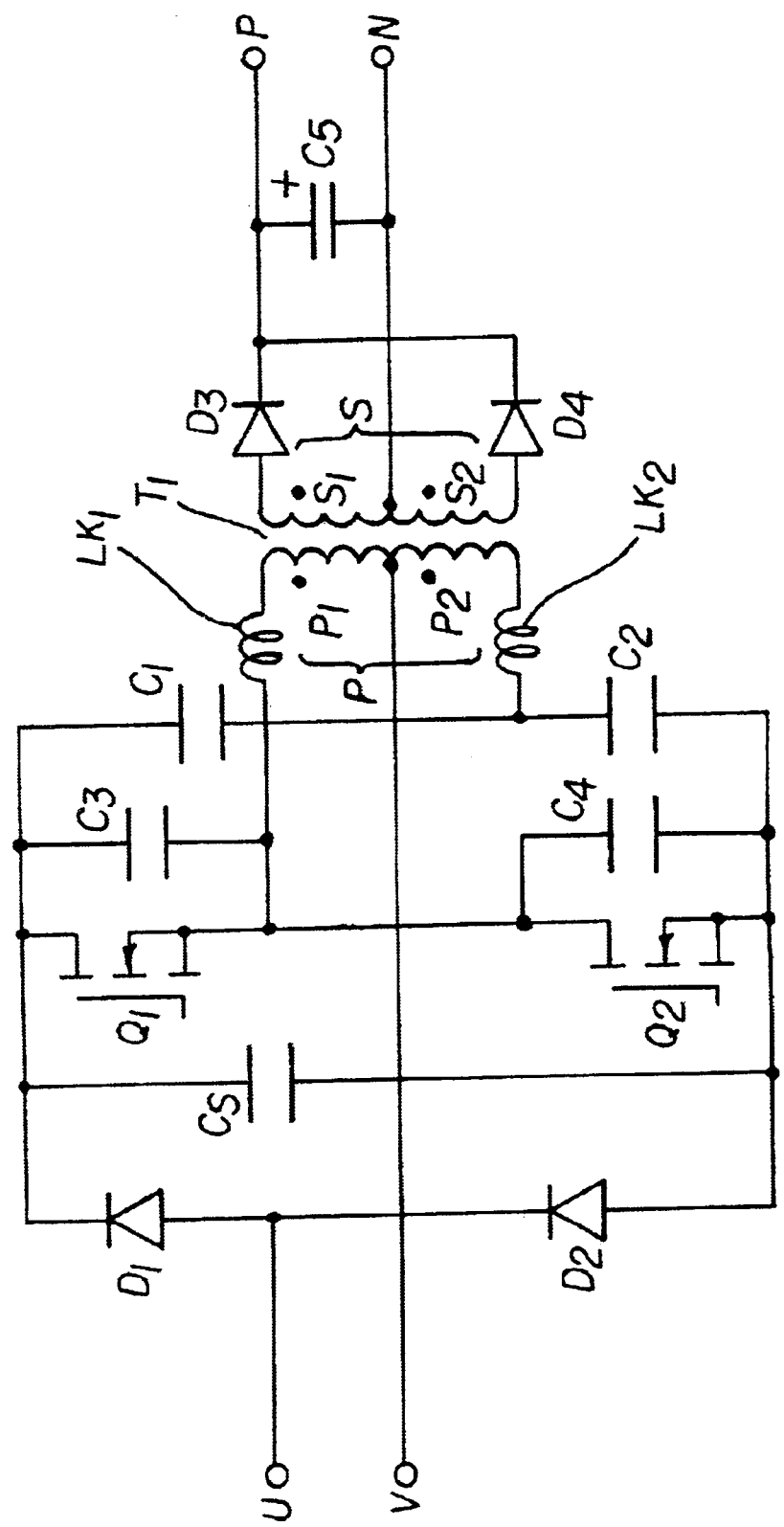
FIG. 1 is a diagram of a switching power supply circuit according to the first embodiment of the invention.

Now the invention will be described in detail hereinafter with reference to the accompanied drawings, which illustrate the preferred embodiments of the invention. The same reference numerals and symbols designate the same or similar elements Referring to FIG. 1, which is a diagram of a switching power supply circuit according to a first embodiment of the invention, the switching power supply circuit includes a first series circuit, which includes diodes $D_1$ and $D_2$ connected in series with each other, a second series circuit, which includes MOSFETs $Q_1$ and $Q_2$ connected in series with each other, a third series circuit, which includes a first capacitor $C_1$ and a second capacitor $C_2$ connected in series with each other, and a snubber capacitor $C_S$. The first series circuit, the second series circuit, the third series circuit and the snubber capacitor $C_S$ are connected in parallel with each other. A third capacitor $C_3$ is connected in parallel with the MOSFET $Q_1$ and a fourth capacitor $C_4$ with the MOSFET $Q_2$. The third capacitor $C_3$ or the fourth capacitor $C_4$, however, can be omitted.

A first AC input terminal U is connected to both diodes $D_1$ and $D_2$ or the common connection point of the diodes $D_1$ and $D_2$. An end of the primary winding P of a transformer $T_1$ having center taps is connected to both MOSFETs $Q_1$ and $Q_2$ or the common connection point of the MOSFETs $Q_1$ and $Q_2$. The other end of the primary winding P of the transformer $T_1$ is connected to both capacitors $C_1$ and $C_2$ or the common connection point of the capacitors $C_1$ and $C_2$. The center tap of the primary winding P is connected to a second AC input terminal V. An end of a capacitor $C_5$ is connected to both ends of the secondary winding S of the transformer $T_1$ via the diodes $D_3$ and $D_4$. The other end of the capacitor $C_5$ is connected to the center tap of the secondary winding S of the transformer $T_1$. The primary winding P of the transformer $T_1$ is divided by the center tap thereof into two sections $P_1$ and $P_2$. The secondary winding S of the transformer $T_1$ is divided by the center tap thereof into two sections $S_1$ and $S_2$. Leakage inductance $LK_1$ and $LK_2$ on the primary side of the transformer $T_1$ and DC output terminals P and N connected to the capacitor $C_5$ are shown in FIG. 1.

Figure 3B:
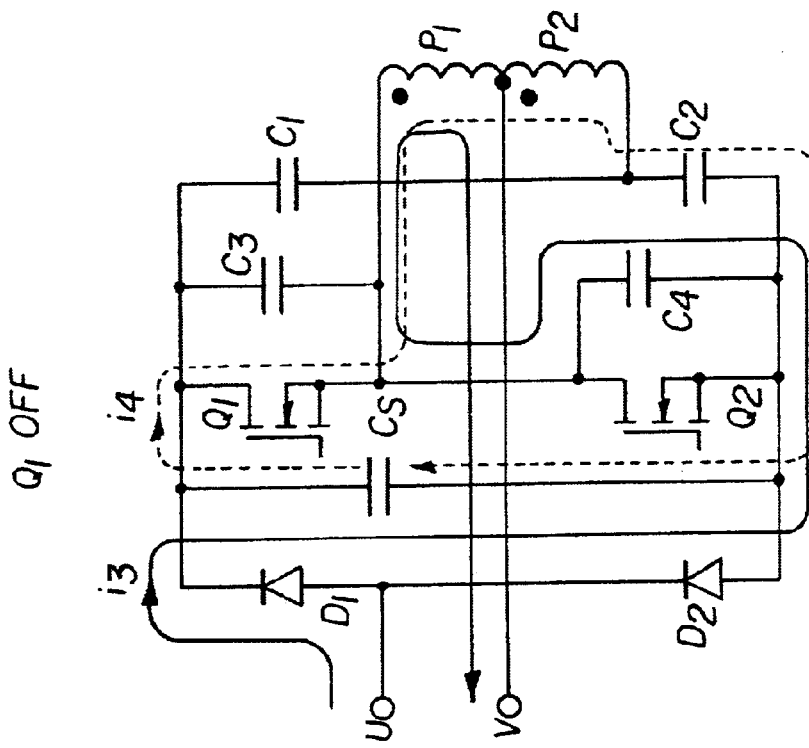
FIGS. 3(a) through 3(d) are circuit diagrams illustrating the current paths of the MOSFETs shown in FIG. 1.

Now the operations of the switching power supply circuit according to the first embodiment will be described with reference to FIGS. 3(a) through 3(d) and FIG. 4. FIGS. 3(a) through 3(d) are circuit diagrams describing the current paths caused by the ON and OFF cycling of the MOSFETs $Q_1$ and $Q_2$. FIG. 4 shows the wave forms of the voltages and the currents at certain points of the circuit shown in FIG. 1.

Figure 3A:
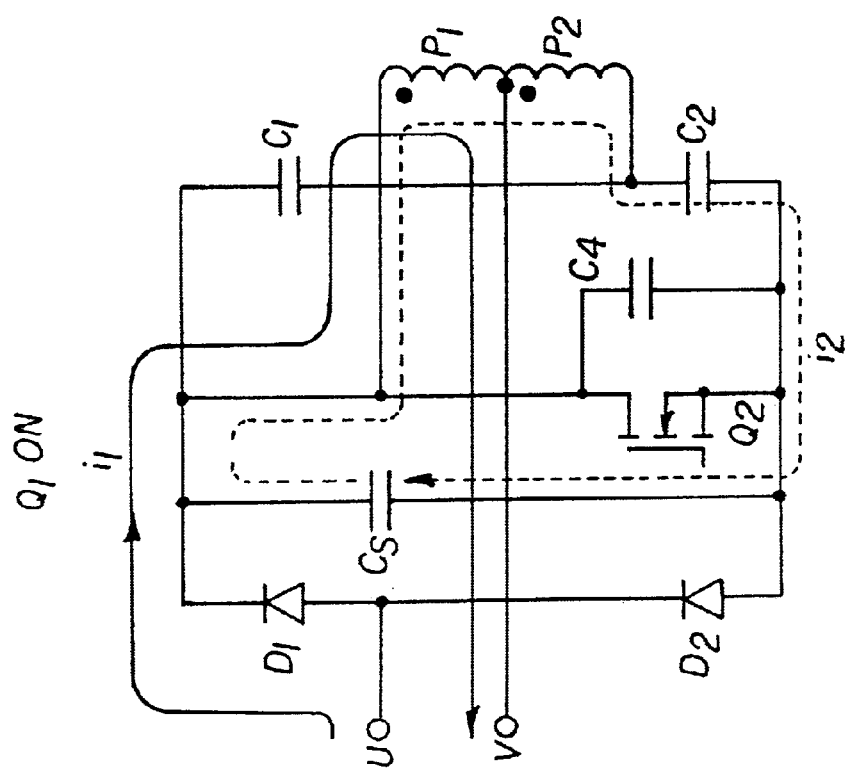
Figure 4:
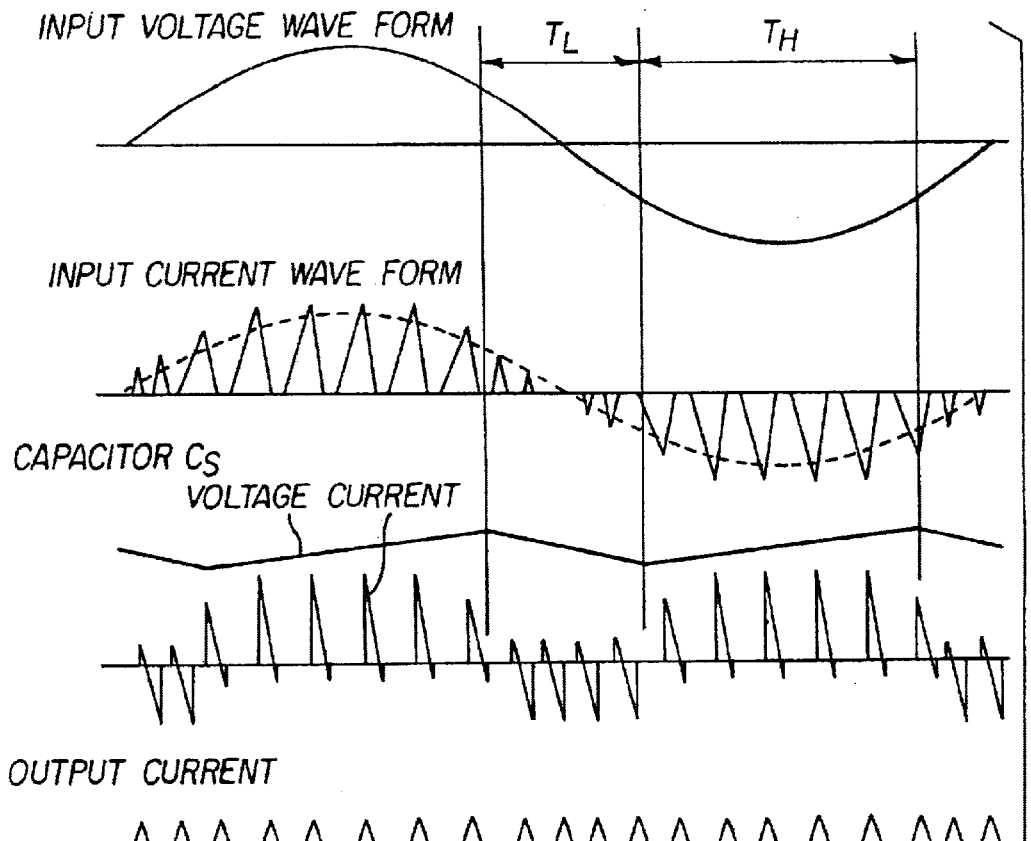
FIG. 4 shows the wave forms of the voltages and the currents at certain points of the circuit shown in FIG. 1.
Figure 5:
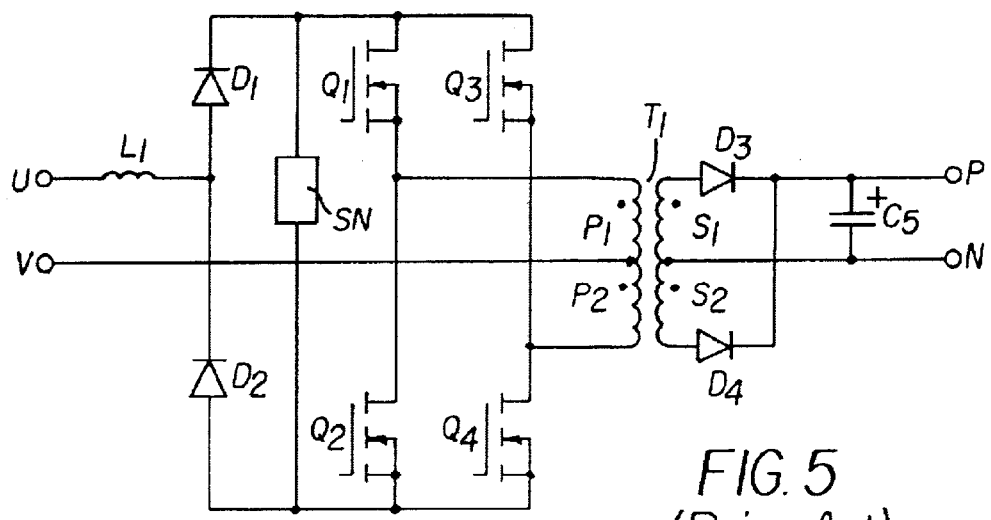
FIG. 5 is a diagram of a conventional switching power supply circuit.

By switching ON the MOSFET $Q_1$ while the AC input voltage is positive, a current $i_1$ is made to flow, as illustrated by the solid curve in FIG. 3(a), from the AC input terminal U to the AC input terminal V via the diode $D_1$, the MOSFET $Q_1$, and the primary winding section $P_1$ of the transformer $T_1$, storing energy in the leakage inductance $LK_1$ of the primary winding of the transformer $T_1$. At the same time, a current $i_2$ is made to flow, as illustrated by the dotted curve in FIG. 3(a), from the capacitor $C_S$ to the capacitor $C_2$ via the MOSFET $Q_1$ and the primary winding sections $P_1$, $P_2$ of the transformer $T_1$, discharging the energy stored so far in the capacitor $C_S$ to the secondary side via the transformer $T_1$.

By switching OFF the MOSFET $Q_1$, a current $i_3$ is made to flow, as illustrated by the solid curve in FIG. 3(b), from the AC input terminal U to the AC input terminal V via the diode $D_1$, the capacitor $C_S$, the capacitor $C_4$, and the primary winding section $P_1$ of the transformer $T_1$, storing energy in the capacitor $C_S$ and discharging the capacitor $C_4$. At the same time, a current $i_4$ is made to flow from the capacitor $C_S$ to the capacitor $C_2$ via the capacitor $C_3$ and the primary winding sections $P_1$ and $P_2$ of the transformer $T_1$, charging up the capacitor $C_3$. When the MOSFET $Q_1$ is switched OFF during the operations described above, the voltages at both ends of the capacitor $C_3$ are zero. The zero-voltage switching reduces the switching loss.

Figure 3D:
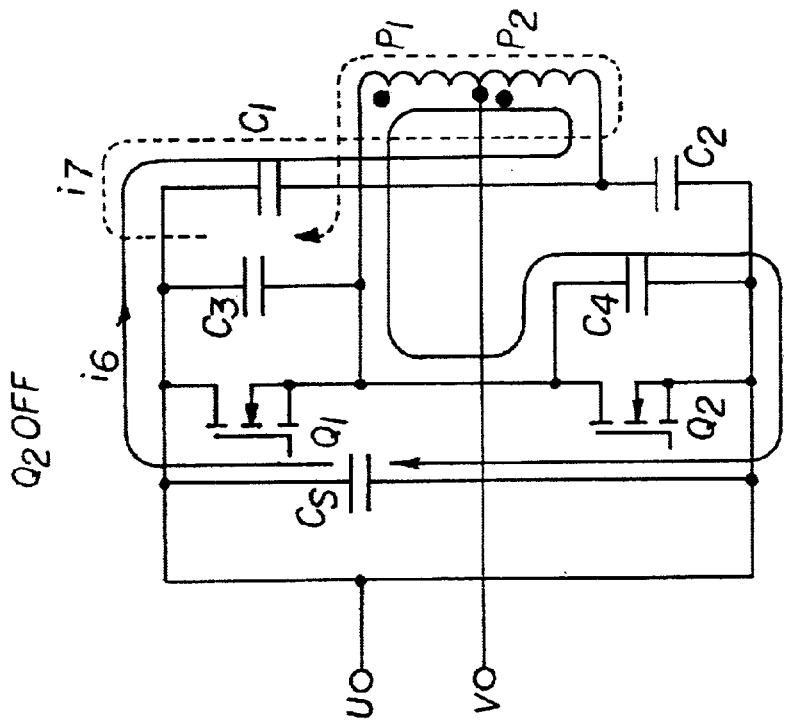
Figure 3C:
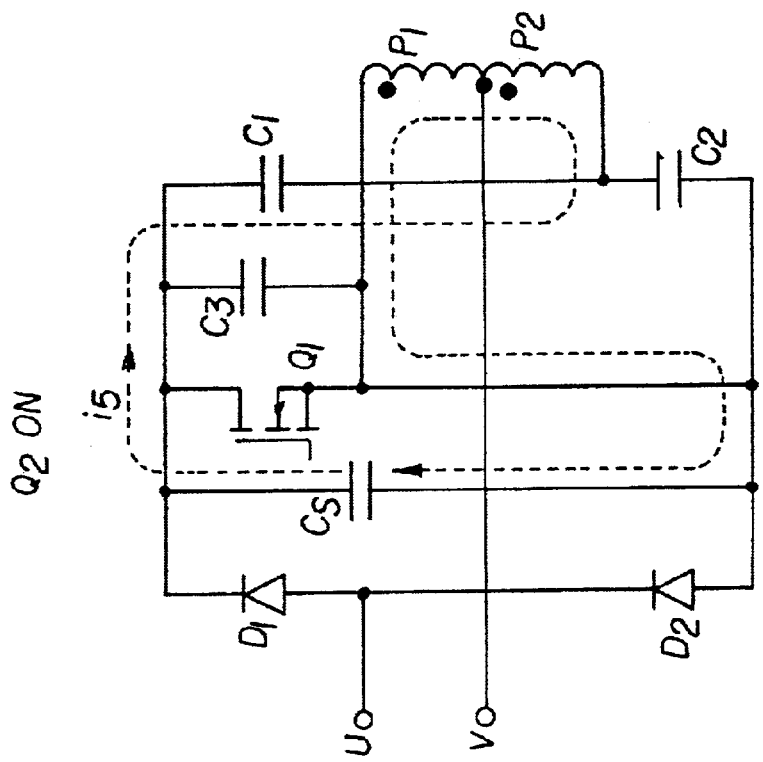

By switching ON the MOSFET $Q_2$, a current $i_5$ is made to flow, as illustrated in FIG. 3(c), from the capacitor $C_S$ to the capacitor $C_S$ via the capacitor $C_1$, the primary winding sections $P_2$ and $P_1$ of the transformer $T_1$, and the MOSFET $Q_2$, discharging the energy stored in the capacitor $C_S$ to the secondary side of the transformer $T_1$ via the primary winding P thereof.

By switching OFF the MOSFET $Q_2$, a current $i_6$ is made to flow, as illustrated in FIG. 3(d), from the capacitor $C_S$ to the capacitor $C_4$ via the capacitor $C_1$ and the primary winding sections $P_2$ and $P_1$ of the transformer $T_1$, charging up the capacitor $C_4$, and a current $i_7$ is made to flow from the capacitor $C_3$ to the capacitor $C_3$ via the capacitor $C_1$ and the primary winding sections $P_2$ and $P_1$ of the transformer $T_1$, discharging the capacitor $C_3$. When the MOSFET $Q_2$ is switched OFF during the operations described above, the voltages at both ends of the capacitor $C_4$ are zero. The zero-voltage switching reduces the switching loss.

In the switching power supply circuit according to the first embodiment, the zero-voltage switching operations of the MOSFETs $Q_1$ and $Q_2$ are facilitated by charging and discharging the capacitors $C_3$ and $C_4$ connected respectively in parallel with the MOSFETs $Q_1$ and $Q_2$. After the operations described with reference to FIG. 3(d) are over, the operations described in FIGS. 3(a) through 3(d) are repeated. Thus, by switching ON and OFF the MOSFETs $Q_1$ and $Q_2$ at a high frequency, the primary winding P of the transformer $T_1$ becomes excited and unexcited repeatedly, and the current having the wave form as shown in the bottom portion of FIG. 4 is output from the DC output terminals P and N via the secondary winding S of the transformer $T_1$ and the diodes $D_3$ and $D_4$.

According to the first embodiment, the magnitudes of the AC input current and the current for charging up the capacitor $C_S$ are regulated by adjusting the ON period of the MOSFET $Q_1$. The electric power feed to the load is regulated by adjusting the ON periods of the MOSFETs $Q_1$ and $Q_2$. Therefore, the AC input current can be controlled by adjusting the ON-OFF duty ratio of the MOSFET $Q_1$. The electric power feed to the load or the output voltage can be controlled by adjusting the ON period and the OFF period, i.e., the operating frequency of the MOSFET $Q_2$, once the ON period of the MOSFET $Q_1$ is set.

While the AC input voltage is negative, the switching power supply circuit according to the first embodiment operates in the same manner as described above by exchanging the operation of the MOSFET $Q_1$ and the operation of the MOSFET $Q_2$ with each other. In other words, the energy is stored in the leakage inductance $LK_2$ by switching ON the MOSFET $Q_2$ in FIG. 3(a). The MOSFET $Q_2$ is switched OFF in FIG. 3(b). The MOSFET $Q_1$ is switched ON in FIG. 3(c) and switched OFF in FIG. 3(d).

Energy is stored in the leakage inductance $LK_1$ of the primary winding P and the energy stored in the snubber capacitor $C_S$ is discharged by switching ON one of the switching devices $Q_1$, $Q_2$. Energy is stored in the snubber capacitor $C_S$ by switching OFF the same switching device. The energy stored in the snubber capacitor $C_S$ is discharged by switching ON the other of the switching devices $Q_2$, $Q_1$. Since it is possible to discharge the energy stored in the snubber capacitor $C_S$ by switching ON the switching device even when the AC input voltage is zero, it becomes possible to reduce the ripple voltage without interrupting the electric power to be output. Therefore, it is not necessary for the capacitor $C_5$ on the load side to have a large capacity. Since the energy stored in the capacitor $C_S$ is discharged to the load during the period $T_L$, for that the AC input voltage is low as shown in FIG. 4, and since the capacitor $C_S$ is charged up while the electric power is fed to the load during the period $T_H$, for that the AC input voltage is high, the ripple voltage is reduced without interrupting the electric power to be output.

Figure 2:
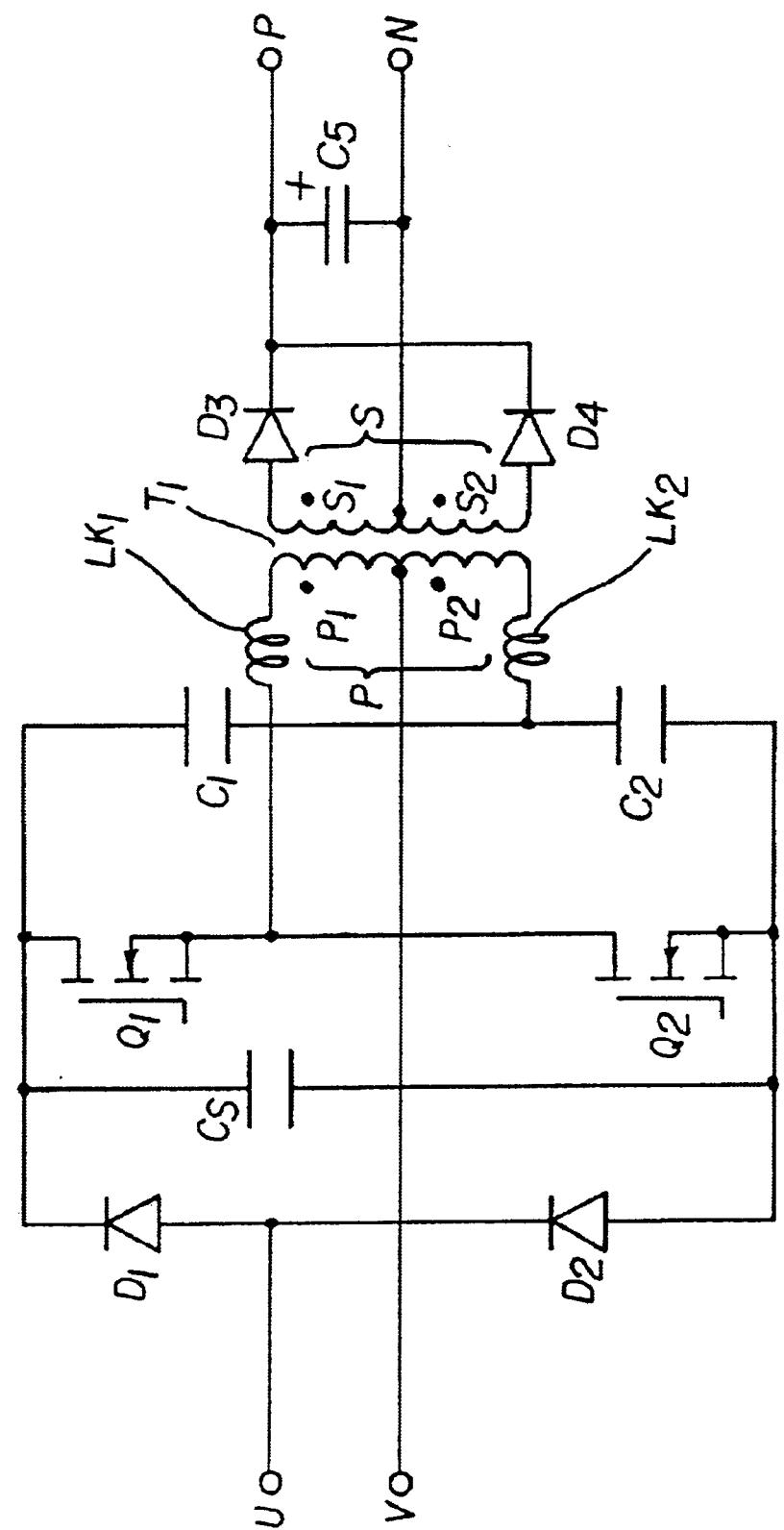
FIG. 2 is a diagram of a switching power supply circuit according to the second embodiment of the invention.

FIG. 2 is a diagram of a switching power supply circuit according to a second embodiment of the invention. The switching power supply circuit according to the second embodiment is different from the switching power supply circuit according to the first embodiment in that the capacitors $C_3$ and $C_4$ incorporated in the switching power supply circuit according to the first embodiment are omitted from the switching power supply circuit according to the second embodiment. Since the currents for charging and discharging the capacitors $C_3$ and $C_4$ do not exist according to the second embodiment, the MOSFETs $Q_1$ and $Q_2$ do not execute zero-voltage switching. However, the operations associated with the switching of the MOSFETs $Q_1$ and $Q_2$, such as the discharge of the energy stored in the capacitor $C_S$, are conducted in the same manner as those of the switching power supply circuit according to the first embodiment shown in FIG. 1. The switching power supply circuit according to the second embodiment further reduces component count, simplifying the circuit configuration.

Although the switching power supply circuit according to the first embodiment or the second embodiment has been described in connection with the center-tap-type full-wave rectifying circuit for the rectifying circuit on the secondary side of the transformer $T_1$, the other rectifying circuits, such as a half-wave rectifying circuit, a full-wave rectifying circuit employing four diodes and a fly-back-type rectifying circuit may be applied.

Although it is necessary for the conventional switching power supply circuit to employ four switching devices, it is enough for the switching power supply circuit according to the invention to employ only two switching device. The switching power supply circuit according to the invention thus simplifies the driving circuits, while using the leakage inductance of the transformer in place of the input side reactor. Therefore, the switching power supply circuit according to the invention can reduce the components, and thus reduces the size, weight, and cost.

Since the switching power supply circuit according to the invention feeds electric power continuously, the switching power supply circuit according to the invention reduces the voltage ripples caused by the discontinuous electric power feed from the conventional switching power supply circuit and reduces the capacity of the capacitor on the load side. Therefore, the size, weight, and cost of the switching power supply circuit are further reduced. Moreover, the switching power supply circuit that executes zero-voltage switching facilitates to reduce the switching loss, improving the electric power conversion efficiency and down-sizing the cooling apparatus.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP PA 2001-253737, in its entirety, including the drawings, claims, and the specification thereof, is incorporated herein by reference.

What is claimed is:

1. A switching power supply circuit comprising:
    a transformer having a primary winding with a center tap and a secondary winding;
    a pair of diodes connected in series;
    a pair of switching devices connected in series;
    a pair of capacitors connected in series;
    a snubber capacitor;
    a first AC input terminal connected to both of the pair of diodes; and
    a second AC input terminal connected to the center tap of the primary winding,
    wherein the snubber capacitor, the pair of diodes, the pair of switching devices, and the pair of capacitors are connected in parallel,
    wherein one end of the primary winding is connected to both of the pair of switching devices, and
    wherein the other end of the primary winding is connected to both of the pair of capacitors.

2. The switching power supply circuit according to claim 1, further including a rectifying circuit connected to the secondary winding of the transformer.

3. A switching power supply circuit comprising:
    a switching means for converting a single-phase AC input voltage to a high-frequency AC voltage;
    a transformer for insulating the high-frequency AC voltage, wherein the transformer comprises a primary winding having a center tap and a secondary winding,
    a rectifying circuit for rectifying the insulated high-frequency AC voltage to feed DC electric power to a load;
    a first circuit comprising two diodes connected in series;
    a second circuit comprising two switching devices connected in series;
    a third circuit comprising a first capacitor and a second capacitor connected in series;
    a snubber capacitor, wherein the snubber capacitor, the first circuit, the second circuit and the third circuit are connected in parallel;
    a first AC input terminal connected to a common connection point of the two diodes in the first circuit; and
    a second AC input terminal connected to the center tap of the primary winding,
    wherein one end of the primary winding is connected to the common connection point of the switching devices of the second circuit,
    wherein the other end of the primary winding is connected to the common connection point of the first capacitor and the second capacitor of the third circuit, and
    wherein the rectifying circuit is connected to the secondary winding of the transformer.

4. The switching power supply circuit according to claim 3, further including at least one capacitor connected in parallel with at least one of the switching devices, wherein the at least one capacitor allows at least one of the switching devices to execute a zero-voltage switching.

5. The switching power supply circuit according to claim 3, wherein the switching power supply circuit adjusts an ON-OFF duty ratio of one of the switching devices to regulate the current of the AC input voltage, and the switching power supply circuit adjusts the operating frequency of the other of the switching devices to regulate the DC electric power.

6. The switching power supply circuit according to claim 4, wherein the switching power supply circuit adjusts an ON-OFF duty ratio of one of the switching devices to regulate the current of the AC input voltage, and the switching power supply circuit adjusts the operating frequency of the other of the switching devices to regulate the DC electric power.

* * * * *